US011768910B2

(12) United States Patent
Silkey et al.

(10) Patent No.: US 11,768,910 B2
(45) Date of Patent: *Sep. 26, 2023

(54) ENHANCED METADATA COLLECTION AND OUTPUT

(71) Applicant: EINSTEIN INDUSTRIES, INC., San Diego, CA (US)

(72) Inventors: Robert Silkey, San Diego, CA (US); Ted Ricasa, San Diego, CA (US); Sergiy Zubatiy, San Diego, CA (US); Jeremy Michael Hawkins, San Diego, CA (US); Christopher Cherry, San Diego, CA (US)

(73) Assignee: EINSTEIN INDUSTRIES, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/459,947

(22) Filed: Aug. 27, 2021

(65) Prior Publication Data
US 2021/0390156 A1 Dec. 16, 2021

Related U.S. Application Data

(63) Continuation of application No. 15/568,786, filed as application No. PCT/US2016/030234 on Apr. 29, 2016, now Pat. No. 11,106,760.
(Continued)

(51) Int. Cl.
*G06F 3/0481* (2022.01)
*G06F 16/958* (2019.01)
(Continued)

(52) U.S. Cl.
CPC .......... *G06F 16/986* (2019.01); *G06F 3/0481* (2013.01); *G06F 16/2246* (2019.01);
(Continued)

(58) Field of Classification Search
None
See application file for complete search history.

(56) References Cited

U.S. PATENT DOCUMENTS 8,041,746 B2 * 10/2011 Stuhec .................. G06F 40/143
  707/802
8,271,542 B1 9/2012 London
(Continued)

OTHER PUBLICATIONS

International Preliminary Report on Patentability dated Nov. 16, 2017 for related International Application No. PCT/US2016/030234, in 8 pages.

*Primary Examiner* — Ariel Mercado
(74) *Attorney, Agent, or Firm* — PROCOPIO, CORY, HARGREAVES & SAVITCH LLP

(57) ABSTRACT

Enhanced metadata with optimized output. In an embodiment, a content object is received. First metadata to be associated with the content object is determined. At least one metadata field to be acquired is determined based on an association, within a stored knowledge structure, of the at least one metadata field with the first metadata. Second metadata to be associated with the content object is acquired based on the at least one metadata field. A metadata structure and markup format for the content object are determined. The metadata structure incorporates both the first metadata and the second metadata. The content object is output with the metadata structure and in the markup format.

19 Claims, 5 Drawing Sheets

Related U.S. Application Data

(60) Provisional application No. 62/156,111, filed on May 1, 2015.

(51) Int. Cl.
    *G06F 16/25*    (2019.01)
    *G06F 16/22*    (2019.01)
    *G06F 40/143*    (2020.01)

(52) U.S. Cl.
    CPC .......... *G06F 16/258* (2019.01); *G06F 16/958* (2019.01); *G06F 40/143* (2020.01)

(56) References Cited

U.S. PATENT DOCUMENTS

| | | | |
|---|---|---|---|
| 2002/0111932 A1* | 8/2002 | Roberge | G06F 3/0482 |
| 2004/0153968 A1 | 8/2004 | Ching et al. | |
| 2005/0273768 A1* | 12/2005 | Doughan | G06F 40/143 |
| | | | 717/136 |
| 2006/0101058 A1* | 5/2006 | Chidlovskii | G06F 40/143 |
| | | | 707/999.102 |
| 2010/0106672 A1* | 4/2010 | Robson | G06F 16/907 |
| | | | 706/50 |
| 2012/0179639 A1 | 7/2012 | Robson et al. | |
| 2014/0236972 A1* | 8/2014 | William | G06F 16/86 |
| | | | 707/755 |
| 2014/0282219 A1* | 9/2014 | Haddock | G06F 16/22 |
| | | | 715/781 |
| 2014/0289273 A1 | 9/2014 | Embert et al. | |
| 2015/0007095 A1 | 1/2015 | Laturner, Jr. et al. | |

\* cited by examiner

ENHANCED METADATA COLLECTION AND OUTPUT

CROSS-REFERENCE TO RELATED APPLICATIONS

This application is a continuation of U.S. patent application Ser. No. 15/568,786, filed on Oct. 23, 2017, and issued as U.S. Pat. No. 11,106,760 on Aug. 31, 2021, which is a national stage entry of International Patent App. No. PCT/US2016/030234, filed on Apr. 29, 2016, which claims priority to U.S. Provisional Patent App. No. 62/156,111, filed on May 1, 2015, which are all hereby incorporated herein by reference as if set forth in full.

BACKGROUND

Field of the Invention

The embodiments described herein are generally directed to enhanced metadata, and, more particularly, to the definition, management, organization, optimization, and/or retrieval of metadata, and/or the retrieval and/or presentation of its associated content objects.

Description of the Related Art

Conventional content management systems, such as Wordpress™ and Joomla™ generally use a variety of plugins and standards to classify and distribute content. However, there is currently no agreed-upon standard for the definition, organization, retrieval, and presentation of objects within these content management systems and output by these content management systems.

In addition, these conventional content management systems do not maintain the integrity of metadata, which is commonly defined as data that describes other data. Nor do these conventional content management systems generate or maintain enough content-associated metadata to filter, syndicate, or manage the content effectively or optimally. For example, conventional content management systems are characterized by shortcomings in their abilities to accurately classify content objects, identify and gather specific content objects while creating a new content object, and distribute content objects across a wide network while maintaining integrity of the associated metadata.

SUMMARY

Accordingly, systems, methods, and non-transitory computer-readable media are disclosed for enhanced metadata collection.

In an embodiment, a method is disclosed. The method comprises using at least one hardware processor to: receive a content object; determine first metadata to be associated with the content object; determine at least one metadata field to be acquired based on an association, within a stored knowledge structure, of the at least one metadata field with the first metadata; acquire second metadata to be associated with the content object based on the at least one metadata field; determine a metadata structure for the content object, wherein the metadata structure incorporates both the first metadata and the second metadata; determine a markup format for the content object; and output the content object with the metadata structure and in the markup format.

In another embodiment, a system is disclosed. The system comprises: at least one hardware processor; and one or more software modules that, when executed by the at least one hardware processor, receive a content object, determine first metadata to be associated with the content object, determine at least one metadata field to be acquired based on an association, within a stored knowledge structure, of the at least one metadata field with the first metadata, acquire second metadata to be associated with the content object based on the at least one metadata field, determine a metadata structure for the content object, wherein the metadata structure incorporates both the first metadata and the second metadata, determine a markup format for the content object, and output the content object with the metadata structure and in the markup format.

In another embodiment, a non-transitory computer-readable medium is disclosed. The medium has instructions stored thereon, wherein the instructions, when executed by a processor, cause the processor to: receive a content object; determine first metadata to be associated with the content object; determine at least one metadata field to be acquired based on an association, within a stored knowledge structure, of the at least one metadata field with the first metadata; acquire second metadata to be associated with the content object based on the at least one metadata field; determine a metadata structure for the content object, wherein the metadata structure incorporates both the first metadata and the second metadata; determine a markup format for the content object; and output the content object with the metadata structure and in the markup format.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
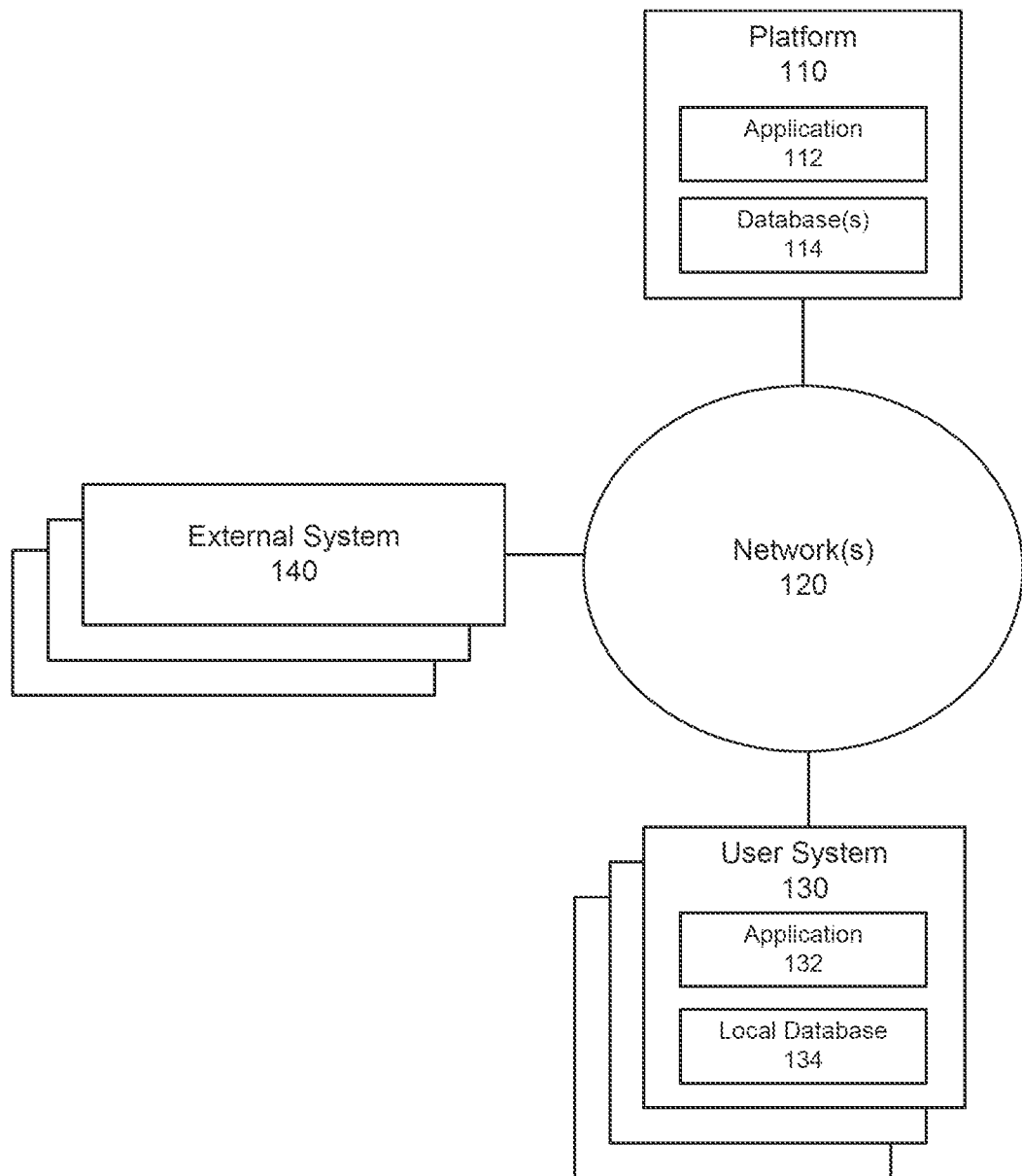
FIG. 1 illustrates an example infrastructure, in which one or more of the processes described herein, may be implemented, according to an embodiment.

In an embodiment, systems, methods, and non-transitory computer-readable media are disclosed for enhanced metadata collection and/or optimized output. Various embodiments may solve one or more of the shortcomings of conventional content management systems by, for example, intelligently collecting metadata at the time that data objects are created or received, using predefined internal and/or external (e.g., published) metadata structures. In an embodiment, an end-to-end system is provided that focuses on smart classification of content objects and/or the smart output of those content objects in various forms. Such a system can make it easier for a website operator to manage a website, keep the website up-to-date with current standards (e.g., schemas), and/or improve web site performance with respect to search engine visibility, user experience, scalability, compatibility, and/or flexibility.

Advantageously, certain embodiments disclosed herein treat metadata with the same importance as content objects, improve the performance of web sites with respect to search engines, improve content delivery and the recall of content (e.g., from external systems, such as GPS, game consoles, electronic kiosks, etc.), and/or enable virtually limitless sorting, filtering, organization, and display of content objects based on metadata (whether for a single client's content or multiple clients' content).

In addition, certain embodiments disclosed herein provide an efficient means to automatically or semi-automatically generate content to be used in a webpage. For example, a doctor may create a new webpage for rhinoplasty, and an embodiment of the system may automatically generate markup, for content objects that are associated with metadata related to rhinoplasty (e.g., a rhinoplasty photograph, a rhinoplasty video, a link to a blog post about rhinoplasty, etc.), to be used in the webpage. In this manner, a user could essentially create a webpage for any subject, on demand.

Furthermore, certain embodiments disclosed herein continually adapt to the evolution of metadata formats. For example, a current metadata schema may subsequently evolve, in the future, into a new metadata schema that is markedly different. In some embodiments, the disclosed platform can adopt any future metadata schema, as they arise, thereby evolving with the schema, and do so seamlessly in the background without any disruption in service to end users. Thus, certain embodiments are always able to dynamically output content according to the most current standards, metadata structures, and formats.

For example, certain embodiments enable the extension of metadata structures (e.g., by updating a knowledge base, as described elsewhere herein). Thus, metadata structures may evolve, via such extensions, even before these extensions are adopted as standards. For example, attributes associated in metadata with content objects related to medical procedures can be defined and output, for medical procedures that do not even exist yet in standard schemas (e.g., schema.org). Thus, a high volume of new metadata structures can be collected and output, with the potential to influence the adoption of metadata structures by standard-making bodies.

Certain embodiments disclosed herein may also output metadata in a specific structure or format, or multiple structures and/or formats, based on the type of content with which the metadata is associated. For example, a user might input an address, to be used as metadata associated with a content object, and, based on the identification of the metadata as an address, an embodiment of the disclosed system may automatically determine to use a particular schema for an office location (e.g., the LocalBusiness schema at schema.org), wrapped in a particular markup format (e.g., Microdata).

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

The system will now be described in detail with respect to example embodiments.

1.1. Infrastructure

FIG. 1 illustrates an example infrastructure for enhanced metadata collection and/or optimized output, according to an embodiment. The infrastructure may comprise a platform 110 (e.g., one or more servers) which hosts and/or executes one or more of the various functions, processes, methods, and/or software modules described herein. Platform 110 may comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., websites, apps, other platforms, etc.) via one or more networks 120. Network(s) 120 may comprise the Internet, and platform 110 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. In an embodiment, platform 110 may not comprise dedicated servers, but may instead comprise cloud instances, which utilize shared resources of one or more servers. It should also be understood that platform 110 may comprise, but is not required to comprise, collocated servers or cloud instances. Furthermore, while platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to another subset of user systems 130 and/or external systems 140 via an intranet. It should also be understood that user system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and the like. In addition, while only a few user systems 130 and external systems 140, one server application 112, and one set of database(s) 114 are illustrated, it should be understood that the infrastructure may comprise any number of user systems, external systems, server applications, and databases.

Platform 110 may comprise web servers which host one or more websites or web services. In embodiments in which a website is provided, the website may comprise one or more user interfaces, including, for example, webpages generated in HyperText Markup Language (HTML) or other language. Platform 110 transmits or serves these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to platform 110 and the responses from platform 110, including the user interfaces, may both be communicated through network(s) 120, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (not shown) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Sybase™, Access™, and the like, including cloud-based database instances and proprietary databases. Data may be sent to platform 110, for instance, using the well-known POST request supported by HTTP, via FTP, etc. This data, as well as other requests, may be handled, for example, by server-side web technology, such as a servlet or other software module (e.g., application 112), executed by platform 110.

In embodiments in which a web service is provided, platform 110 may receive requests from external system(s) 140, and provide responses in eXtensible Markup Language (XML) and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, etc., described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case application 112 performs all processing) or user system(s) 130 (e.g., in which case application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

1.2. Example Processing Device

Figure 2:
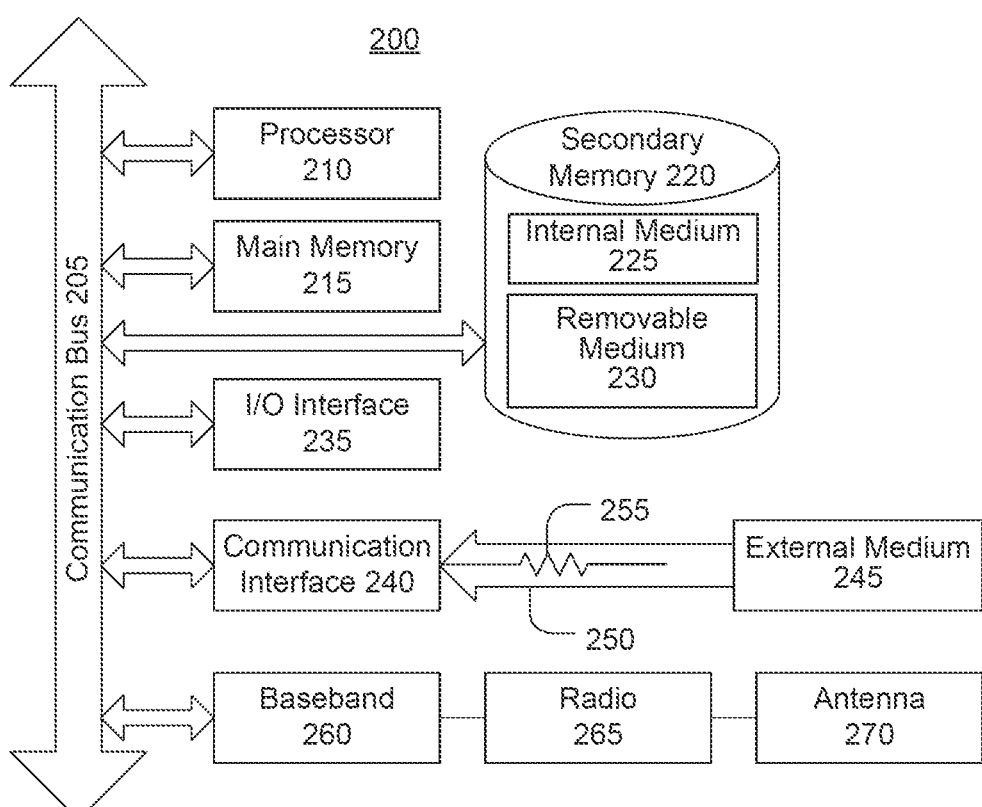
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example system 200 may be used as or in conjunction with one or more of the mechanisms, processes, methods, or functions (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or nonstandard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD)

drive, a digital versatile disc (DVD) drive, other optical drive, a flash memory drive, etc.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software modules and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

1.3. Application

Figure 3:
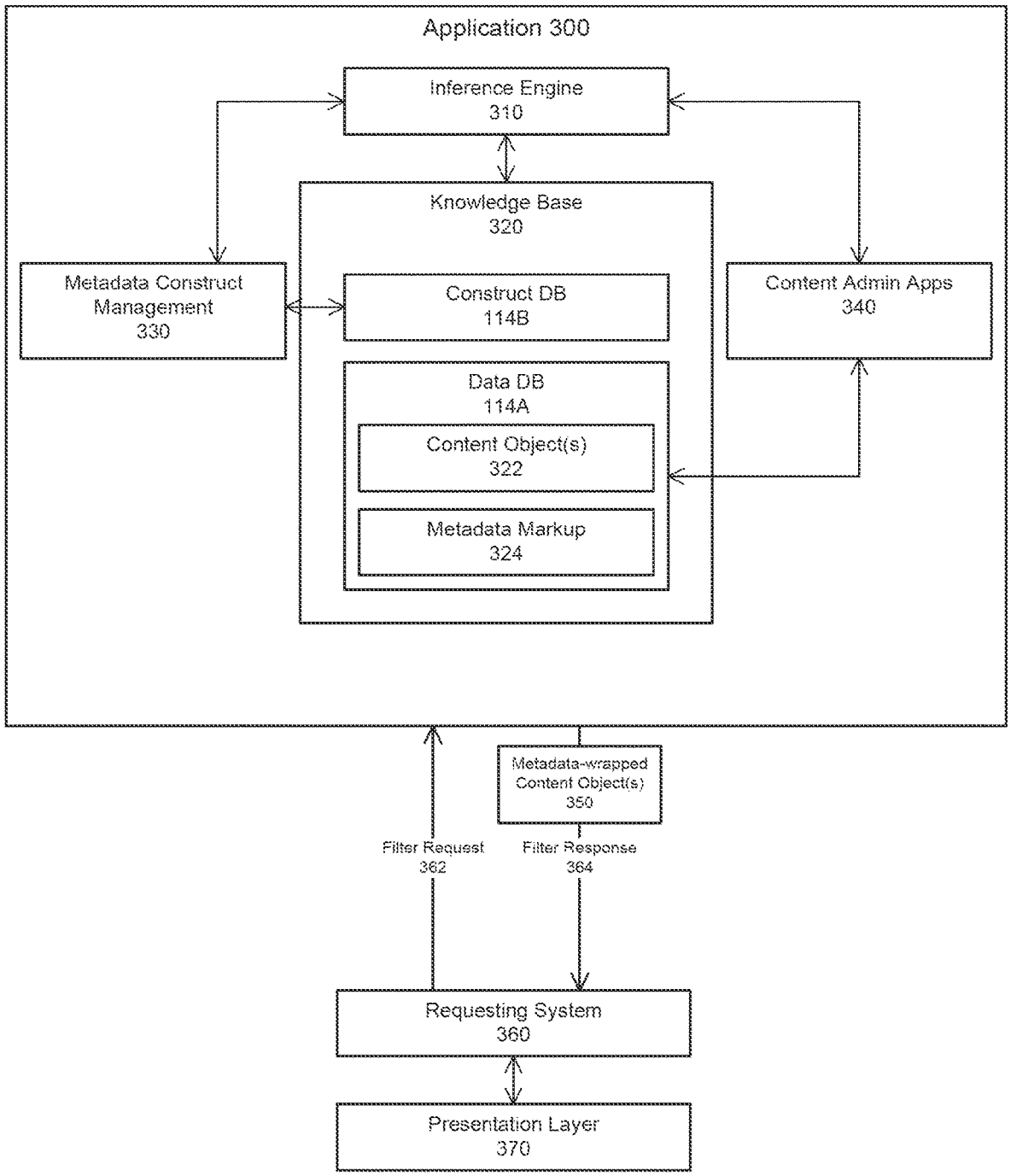
FIG. 3 illustrates an application, according to an embodiment.

FIG. 3 illustrates an application, supported by platform 110, according to an embodiment. Application 300 may be embodied as server application 112, client application 132, or a combination of server application 112 and client application 132. In an embodiment, application 300 comprises an inference engine 310, and comprises or is communicatively connected to a knowledge base 320. Knowledge base 320 may comprise a data database 114A and construct database 114B. Data database 114A may store the metadata associated with a content object (e.g., metadata markup 324), which, as discussed elsewhere herein, may be obtained from embedded metadata, user input, data supplied from construct database 114B, etc. In embodiments in which platform 110 also hosts a content management system, data database 114A may also store the content objects 322 themselves. Construct database 114B may store metadata fields of a schema (e.g., in a knowledge structure, as described elsewhere herein) that can be intelligently associated with content objects, based on embedded metadata, media type, user input, etc.

In an embodiment, application 300 may comprise or be communicatively connected (e.g., via network(s) 120) to a content management system (e.g., for content objects 322 stored in data database 114A), which enables a user (e.g., website operator) to efficiently manage multiple content objects, such as text, photographs or other images, videos, electronic documents, layouts, themes, and/or the like. For example, application 300 may comprise a plurality of modules, collectively depicted as content admin apps 340, which may each correspond to a different type of content object (e.g., webpage, video, image, blog, etc.). Each module may comprise a user interface for inputting content, as well as metadata and/or logic for uploading and displaying each content type.

Application 300 may comprise an administration module, which implements administrative functions for managing application 300. This administration module may comprise a metadata construct management module 330. Metadata construct management module 330 may comprise a user interface and/or logic for generating reports regarding metadata, based on the data stored in data database 114A and/or construct database 114B. Metadata construct management module 330 may also comprise a user interface and/or logic for modifying the metadata stored in construct database 114B. For example, metadata construct management module 330 may be used to add, revise, delete, reorganize, and/or otherwise modify and generate reports based on an internal construct database, representing a hierarchical arrangement of possible metadata fields, stored in construct database 114B.

In an embodiment, application 300 applies certain metadata structures and/or markup formats to content objects based on the content object and/or situation. The best metadata structure (e.g., schema.org, OpenGraph™, Twitter™ Cards, etc.) and/or markup format (e.g., Microdata, JavaScript Object Notation for Linked Data (JSON-LD), Resource Description Framework in Attributes (RDFA), etc.) for a given content object may change as currently-accepted standards evolve. Advantageously, platform 110 may enable a website to evolve as standards, structures, and formats evolve and change, for example, by updating these standards, structures, and formats, as represented in construct database 114B, via metadata construct management module 330.

In an embodiment, application 300 receives filter requests 362 from one or more requesting systems 360 (e.g., Lucid CMS™, DocShop.com, NationalHealthNews.com, an external CMS, a GPS application, etc.) which may be internal or external (e.g., external systems 140), attempts to match each filter request 362 to one or more content objects 322 (e.g., in data database 114A), and responds to each filter request 362 by transmitting any matched content objects or an indication that no content objects were matched, in a filter response 364, to the requesting system 360. Both filter requests 362 and filter responses 364 may be transmitted over network(s) 120.

For example, application 300 may receive a filter request 362 for all before-and-after photographs of breast augmentation patients, between the ages of 32-34, who are 120-140 lbs., between 5'4" and 5'7" in height, had a cup size of B before surgery and a cup size of C after surgery, and had the procedure performed in a 500 mile radius of Los Angeles by a board-certified plastic surgeon with a review rating of four or more stars. In response, application 300 may search the metadata associated with content objects 322 in data database 114A to identify all content objects that match the criteria specified in the filter request 362, and return any identified content objects 350 (or an indication that no content objects were identified) in a filter response 364. Matched content object(s) 350 may be wrapped with the optimal metadata, metadata structure, and metadata format (e.g., based on the type of content object, requesting system 360, etc.).

Requesting system 360 may comprise a platform through which users can submit search queries (e.g., Lucis CMS™, DocShop.com, NationalHealthNews.com, an external CMs, a GPS application, etc.). Requesting system 360 transmits each search query in a filter request 362, through network(s) 120, to application 300. As discussed above, application 300 matches the transmitted search query with relevant metadata to identify content object(s) that satisfy the search query. Application 300 then transmits the matched content object(s) 350, through network(s) 120, to the requesting system 360. Thus, the matched content object(s) 350 may be displayed in a user interface of the requesting system 360, without the user having to be redirected to platform 110. In other words, from the user's perspective, he or she is simply interacting with the requesting system 360, and does not need to know anything about platform 110. The requesting system 360 may, but does not necessarily, use the same metadata standards as platform 110.

It should be understood that application 300, as illustrated in FIG. 3, may comprise or be communicatively connected to fewer, more, or different modules than those shown, comprise or be communicatively connected to fewer, more, or different databases than those shown, and be communicatively connected to fewer, more, or different requesting systems than those shown.

In an embodiment, since platform 110 provides a centralized infrastructure for application 300, if a certain metadata structure or metadata format changes or evolves, the metadata associated with each of the content objects managed by platform 110 may be updated contemporaneously. Thus, by continually updating the metadata structure(s) and/or format(s) in which metadata, associated with content objects, is stored, platform 110 can ensure that content objects, stored in the content management system, may be searched (e.g., by users of requesting system 360) using the most current methods (e.g., schema) of naming, tagging, categorizing, and cataloging. By employing the most current methods, the likelihood that a content object is identified by application 300 (e.g., in response to a filter request 362 of a requesting system 360) may be drastically increased. For example, a typical search engine (e.g., Google™) will more likely return a photograph that, based at least in part on its metadata, is relevant to a given search. Thus, the more metadata that can be provided for the photograph to the search engine, the greater the likelihood that the photograph will be accurately identified by the search engine in response to users' search queries. A doctor's liposuction photographs are more likely to appear in the results from a search engine for a search query using the term "liposuction," if the metadata associated with the photographs includes the term "liposuction" in the proper structure and format. In addition, the more metadata associated with the photographs, the more likely the photographs will be returned in more refined search queries (e.g., based on location, age of patient, area of body being treated, patient's gender, etc.).

Whereas conventional content management systems often treat classification of content objects as an afterthought, application 300 may treat classification of content objects in its content management system as a priority. In an embodiment, application 300 may store content objects and classify these content objects with either structural or descriptive metadata in a plurality of standard formats.

Advantageously, application 300 may prompt a user of a content management system to provide metadata that he or she would not otherwise provide. There are a myriad of metadata that can and should be applied to content objects based on currently-accepted standards, but which are often neglected in conventional content management systems. As an example, many webpages currently have no webpage title. However, a webpage title is an essential element for people and machines to understand what the webpage is about. Indeed, the webpage title is perhaps the simplest form of classification that currently exists. Other examples of frequently-neglected labels include webpage description and keywords. Application 300 can ensure that a user at least considers providing these metadata fields, or even force a user to provide such metadata fields.

In an embodiment, application 300 provides a user interface which comprises one or more inputs that enable a website operator to easily label and/or categorize content objects. In addition, application 300 may employ an inference engine 310. Specifically, in an embodiment, application 300 uses a combination of human input and machine learning to analyze the metadata associated with managed content objects 322 to identify, for example, commonly-used labels and naming conventions. Application 300 can then use the identified labels and naming conventions to generate suggestions to a user, as that user is adding a new content object or inputting new labels for a content object. For example, application 300 may recommend an identified commonly-used naming convention or a name in the identified commonly-used naming convention when the user is inputting a name for the content object (e.g., recommending "breast augmentation" instead of "boob job"). Additionally or alternatively, application 300 may recommend a new label to be added to metadata associated with a content object when the user is inputting labels to be added to the metadata associated with the content object. In this manner, terms may be normalized in metadata, for example, by ensuring that related content objects are tagged with identical labels (e.g., tagging all rhinoplasty photographs with the label "rhinoplasty").

In an embodiment, application 300 may dynamically provide input fields in a user interface that suggest categories and/or labels relative to a specific content object being managed by a user. Schemas are in a constant state of evolution and development. While there are standards organizations (e.g., W3C) and some standard conventions (e.g., schema.org), there is no formal procedure for disseminating this information to content managers. Thus, in addition to commonly-used categories, such as an HTML title and HTML description, in an embodiment, application 300 suggests uncommon categories that a website operator likely would not even know about, but which are appropriate for the given context.

For example, an HTML markup schema type exists for "medical procedure" and is not currently included in any known conventional content management systems. For a doctor's website, application 300 (e.g., via content admin apps 340) may prompt the doctor to input information provided for by the "medical procedure" schema type, and then generate appropriate code based on the inputted information. As an example, application 300 may determine that the content object is a doctor's webpage for a particular medical procedure, determine that the "medical procedure" schema type is appropriate based on the determination that the content object is a doctor's webpage for a particular medical procedure, determine that the "medical procedure" schema type includes a "name" property, prompt the website operator (e.g., the doctor) to input a name for the medical procedure represented by the doctor's webpage, receive an inputted name of "Liposuction", and responsively generate the following code to be included in the doctor's webpage:

```
<div itemscope itemtype=http://schema.org/MedicalProcedure>
    <span itemprop="name">Liposuction</span>
```

For the purposes of illustration, a full code snippet, generated by application 300, for a medical procedure with a photograph as the content object, based on additional responses from the user to prompts in a user interface of application 300, may be:

```
<div itemscope itemtype=http://schema.org/MedicalProcedure>
  <span itemprop="name">Liposuction</span>
  is a technique in cosmetic surgery for removing
  <span itemprop="indication" itemscope
  itemtype="http://schema.org/TreatmentIndication">
    <span itemprop="name">excess fat</span>
  </span>
  from under the skin by suction.
  <span itemscope itemtype="http://schema.org/ImageObject">
    <h2 itemprop="name">Liposuction Patient Before & After</h2>
    <img src="liposuction-before-after.jpg" alt="Liposuction patient before
    and after surgery" itemprop="contentURL" />
    By <span itemprop="author">Jane Doe, M.D.</span>
    Photographed in <span itemprop="contentLocation">New York, NY</span>
    Date uploaded: <meta itemprop="datePublished" content="2008-01-25">Jan.
    25, 2008
    <span itemprop="description">Liposuction of the stomach, love handles,
    and inner thighs</span>
  </span>
</div>
```

In an embodiment, inference engine 310 of application 300 extrapolates information from user inputs. In this manner, application 300 may generate a large amount of information based on the responses received for a small number of user prompts (e.g., via input in one or more user interfaces of application 300). For example, a user interface of application 300 may prompt a user to input information about a video object. Based on this input, inference engine 310 may determine that the video is related to a rhinoplasty procedure (e.g., based on a keyword "rhinoplasty" included in the input information, a profile of the user submitting the video that indicates the user is a rhinoplasty surgeon, etc.). Based, at least in part, on the determination that the video is related to a medical procedure, inference engine 310 may identify one or more metadata fields associated with medical procedures (e.g., in construct database 114B for medical procedures). Inference engine 310 may also identify one or more metadata fields based on the type of content object (i.e., a video). Application 300 may determine what information to collect based on these identified metadata field(s). For example, based on the metadata field(s) identified based on the determination that the video is related to a rhinoplasty procedure, application 300 may determine that it needs to identify the demographics for the rhinoplasty procedure, the conditions for which the procedure is used (e.g., restoring nasal function, aesthetic enhancement, resolving nasal trauma, repairing congenital defects, resolving respiratory impediment, correcting failed primary rhinoplasty, etc.), synonyms for "rhinoplasty," proper spelling of the procedure name, and/or the like. Based on the metadata field(s) identified based on the determination that the type of content object is a video, inference engine 310 may determine that it needs to identify a width and height of the video, etc. This information may be determined from user responses to prompts in a user interface, locally or remotely stored information (e.g., technical metadata embedded in or otherwise associated with the content object), or a combination of user responses and previously stored information. Furthermore, inference engine 310 may make any of its decisions based on other known variables, such as the user (e.g., a user profile), location, time zone, etc.

In an embodiment, platform 110 enables seamless distribution of content objects to one or more third-party platforms. For example, if a doctor builds his or her website using the content management system of platform 110, any object uploaded by the doctor into the content management system can automatically be made available to any requesting system 360 that uses application 300. A photograph uploaded and properly tagged by the doctor, using application 300, can automatically be matched via its metadata and returned in search results 364 requested by a filter request 362 from a requesting system 360. Thus, continuing the example of the doctor above, a user searching for videos related to rhinoplasty on a requesting system 360 may receive, in his or her search results, the rhinoplasty video uploaded by the doctor.

In an embodiment, application 300 is able to automatically improve markup for a webpage or other content object. For example, application 300 may comprise a user interface with an input for specifying a Uniform Resource Identifier (URI), such as Uniform Resource Locator (URL). Application 300 may retrieve the resource at the URL, detect all content objects in the resource, detect existing metadata associated, in the resource, with each of the detected content objects, analyze each detected content object to determine the optimum metadata structure and markup format, and generate new markup according to the optimum metadata structure and markup format. Application 300 can then output the new markup, for example, by providing the new markup to a user to be copied into the code of a webpage located at the URL (e.g., via an HTML, editor, by replacing the webpage located at the URL with the new markup, etc.).

In an embodiment, application 300 normalizes content objects. Thus, one properly-labeled photograph, layout, or theme can be used in multiple places. As an example, a doctor may create a new webpage for rhinoplasty (e.g., via a user interface provided by application 300). Application 300 may prompt the doctor for a page title, and receive a title of "Doctor Smith's Rhinoplasty" as an input from the doctor. Application 300 may parse the received title to identify the term "rhinoplasty" (e.g., by comparing each term to a table stored in construct database 114B), and identify photographs associated with the identified term "rhinoplasty." Thus, when the doctor is selecting a photograph (e.g., via an input of the user interface provided by application 300), application 300 may, at least initially, offer only those photographs associated with the term "rhinoplasty" (e.g., not photographs related to LASIK or liposuction). In an embodiment, application 300 could provide the doctor with the option to browse additional photographs, i.e., other than those associated with the term "rhinoplasty" (e.g., photographs related to LASIK or liposuction) in response to an input from the doctor or other trigger. The doctor may be permitted to browse photographs associated with the doctor (e.g., uploaded by the doctor), photographs associated with one or more other users of application 300, and/or photographs within a public database of photographs within application 300 or accessible by application 300 (e.g., content objects 322 stored in data database 114A).

1.4. Knowledge Base

In an embodiment, application 300 implements or uses a knowledge base 320. Knowledge base 320 is a data management system that enables application 300 to guide user inputs (e.g., title, description, keywords, and/or other metadata for a content object), and translate and provide those user inputs in respective metadata structure(s) and/or markup format(s) that are best suited to the context. The metadata structure(s) (e.g., schema.org, OpenGraph™, Twitter™ Cards, etc.) organize data in a specific order or hierarchy, whereas the markup format(s) represent a specific format in which content objects are output (e.g., Microdata, JSON-LD, RDFA, etc.). In this manner, application 300 can output the proper metadata structure in the proper markup format, for a website or other system, based on each respective content object in the website or other system.

Knowledge base 320 may store a knowledge structure (e.g., in construct database 114B). The knowledge structure may comprise a plurality of nodes (e.g., a graph) arranged in a hierarchy (e.g., a graph with a root node, children nodes, grandchildren nodes, etc.).

In an embodiment, inference engine 310 enables application 300 to ask appropriate questions of a user, based on information intuited from a content object. For example, inference engine 310 may automatically identify the type of a received content object, determine one or more questions to ask the user based on at least a subset of the knowledge structure related to the identified type, prompt the user with the determined question(s), and receive the user's response(s) to those question(s). In addition, inference engine 310 may determine one or more additional questions to ask the user based on the user's response(s) to the previous question(s) and another subset of the knowledge structure (which may be a subset of a previous subset), prompt the user with the additional question(s), and receive the user's response(s) to those questions. Inference engine 310 may continue in this manner, intuiting further metadata based on the user's responses to prior questions and subsets of the knowledge structure, until no further metadata can be intuited (e.g., application 300 traverses a structure of hierarchically-arranged nodes, represented as a knowledge structure within knowledge base 390, to a leaf node).

As a non-limiting example, a user may upload a photograph to application 300. Application 300 may then prompt the user to input information about where the photograph was taken, to which the user may respond by inputting an address. Application 300 then determines the optimal structure and markup for the address as metadata (e.g., by using the LocalBusiness schema at schema.org, and adding the city portion of the address to an HTML "alt" tag). Application 300 may also prompt the user to input a description of the photograph, from which application 300 may determine that the photograph is related to a particular medical procedure (e.g., because the description contains the name of a medical procedure, such as "liposuction" or "rhinoplasty"). Alternatively, application 300 may specifically prompt the user to answer whether or not the photograph is of a specific medical procedure, and, if the user responds in the affirmative, prompt the user to input or select a name of the medical procedure (e.g., from a drop-down menu or other list, via a textbox with autosuggest functionality, etc.). In any case, application 300 (e.g., via inference engine 310) may access a subset of the knowledge structure in knowledge base 320 related to medical procedures in order to intuit further metadata which may be gleaned from the user (e.g., via additional prompts). It should be understood that the prompts described herein may provide the user with a finite number of choices (e.g., using lists, in the form of drop-down menus, or with radio control buttons or checkboxes, etc.), or may allow free-form input (e.g., using textboxes). Regardless of how the metadata is received, application 300 may prompt the user for metadata corresponding to all of the metadata nodes in one or more subsets of the knowledge structure that correspond to previously detected or received metadata, and then output the metadata in metadata structures and markup formats that are associated with the subsets. In the event that free-form input is permitted, if no subset of the knowledge structure of knowledge base 390 can be identified corresponding to a user input to be used as metadata, application 300 may output the metadata according to a default metadata structure and/or markup format (e.g., as a generic "alt" attribute in HTML, having a value of the user input).

In an embodiment, knowledge base 320 is continually or periodically updated. For example, one or more nodes and/or the arrangement of nodes in the knowledge structure may be updated. The updates to knowledge base 320 may be performed based on changes in standard metadata schemas. Additionally, knowledge base 320 may be updated based on niche experience. For example, new relationships and/or attributes between metadata nodes in the knowledge structure of knowledge base 320 can be added based on knowledge or experience, even before such relationships or attributes are adopted by standard-making bodies. In addition, knowledge base 320 may be updated in response to user feedback. For example, if an "additional information" field of metadata frequently contains a certain type of metadata, that type of metadata can be added as a new metadata node in the knowledge structure of knowledge base 320, under the assumption that since it is so frequently used, it should be given a dedicated metadata field. Such types of metadata may be determined using keyword modeling and evaluating common keywords. The addition of new metadata nodes to a hierarchical structure within knowledge base 320 in this manner may require approval from an administrator, majority of users, a predefined group of users, and/or the like.

Figure 4:
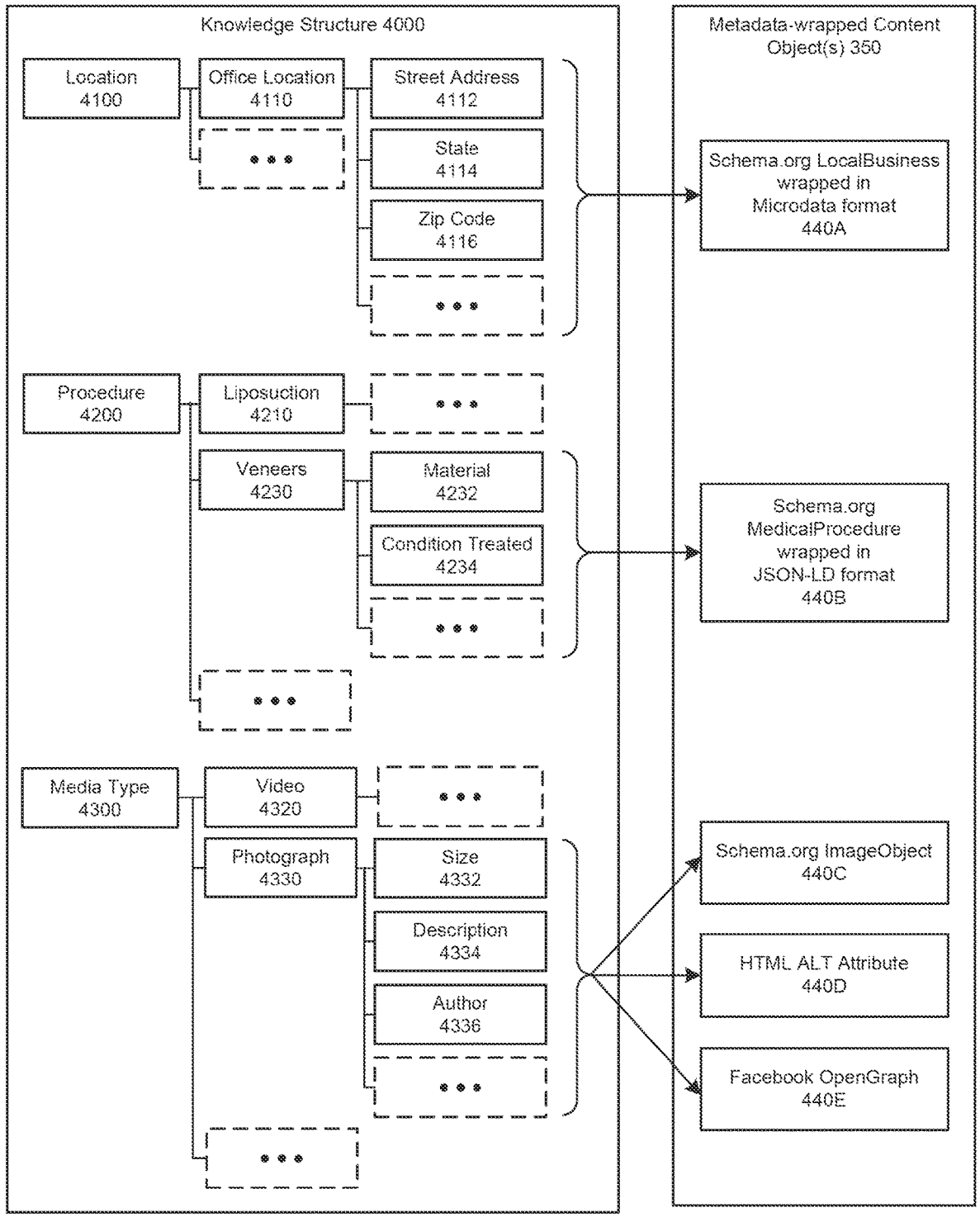
FIG. 4 illustrates an example knowledge structure and examples of optimized output, according to an embodiment.

FIG. 4 illustrates an example hierarchical knowledge structure 4000 within knowledge base 320, according to an embodiment. Knowledge structure 4000 comprises metadata nodes, each representing a possible metadata field, arranged according to a logical organizational hierarchy contained within construct database 114B. In FIG. 4, boxes in broken lines represent any number of additional nodes. However, it should be understood that the illustrated nodes only represent a non-limiting example of a hierarchy, and that a knowledge structure may comprise any number and arrangement of nodes, including fewer, more, or different nodes. The hierarchy, represented by a knowledge structure, serves as an internal metadata schema for organizing metadata, gathered from content objects and/or user inputs regarding content objects (e.g., in response to prompts).

The hierarchy, represented by a knowledge structure, may also serve as a means for prompting the user via a user interface of application 300. For example, as nodes in the knowledge structure are matched to information detected or collected about a content object (e.g., using user prompts), application 300 may loop through the subset (e.g., a subgraph, if the knowledge structure is a graph) of the knowledge structure under each matched node to determine additional relevant metadata nodes representing metadata to be collected. Each additional set of metadata represented by a subset of the knowledge structure may be collected automatically (e.g., by application 300 detecting attributes of the content object or accessing locally or remotely stored metadata for the content object) or manually (e.g., by prompting a user).

When the internal metadata scheme (e.g., the disclosed knowledge structure 4000) of application 300 is organized, the system will arrive at the optimal decision as to which metadata structure and/or markup format should be used for a given content object. For example, specific subsets within the internal knowledge structure of application 300 may be associated with certain metadata structure(s) and/or markup format(s). A particular subset may be associated with more than one metadata structure and/or markup format. For example, a subset associated with a particular metadata structure and/or markup format may partially or wholly overlap with another subset associated with a different metadata structure and/or markup format, in which case, the intersection of the two subsets would have multiple optimal metadata structures and/or markup formats. When multiple optimal metadata structures and/or markup formats are available for a given content object, application 300 may prompt the user to choose one or more of the available metadata structures and/or markup formats, or choose one or more of the available metadata structures and/or markup formats automatically (e.g., based on one or more user-specified settings or other criteria). In an embodiment, each metadata node within the internal knowledge structure of application 300 may map to at least one metadata structure and at least one markup format. Alternatively, any metadata node which does not map to at least one metadata structure or at least one markup format may automatically be associated with a default metadata structure or markup format, respectively. The default metadata structure and/or markup format may be specified by a user.

In an embodiment, application 300 may determine the optimal metadata structure and/or markup format to be used for a given content object based on one or more of the following factors: search trends (e.g., a particular search engine may prefer a certain format as of a certain date); type of content management system in which the content object will be managed (e.g., a different structure/format for WordPress™ than for Lucid™ CMS); type of network; software language being used; security requirements; the particular browser or other software being used to view the content object; the particular search engine being used to retrieve the content object; the particular hardware being used to view the content object; the frequency and/or accuracy of updates to the definitions of metadata structures; etc.

In the illustrated example, knowledge structure 4000, as stored, for example, in construct database 114B, comprises a location node 4100. When application 300 receives a postal address for an office location, application 300 will intuit that the content object should be associated with a location 4100, and therefore, initiate the appropriate metadata-gathering process for a location 4100 (e.g., represented by process 500 implemented by inference engine 310), including an office location 4110. While only a single office location 4110 is illustrated, it should be understood that a user's responses to prompts issued during the metadata-gathering process, using inference engine 310, may result in multiple office locations 4110 being generated. Knowledge structure 4000 is organized according to hierarchical levels. Street address 4112, state 4114, and Zip code 4116 are subsets under office location 4110. Thus, application 300 will generate metadata based on user inputs for each of these nodes. Other nodes within the subset under office location 4110 may include country, location type, etc.

In the illustrated example, knowledge structure 4000, as stored, for example, in construct database 114B, comprises a procedure node 4200. When application 300 detects that a content object is related to a procedure, application 300 may utilize a user interface to further prompt the user for additional metadata based on the subset under procedure node 4200. Similarly, if the user indicates that a content object is related to "dental veneers" (e.g., in response to a prompt for a description of the content object), application 300 may issue a metadata-gathering process using inference engine 310 for additional metadata based on the subset under veneers node 4230. This may result in application 300 prompting a user to input a material for material node 4232, a condition treated for condition treated node 4234, etc.

In the illustrated example, knowledge structure 4000, as stored, for example, in construct database 114B, comprises a media type node 4300, which may be used to detect the type of content object received. Application 300 can detect the type of the content object without input from a user. Alternatively, application 300 may prompt a user via a user interface to specify the type of the content object. In either case, once the media type is determined, application 300 may initiate a metadata-gathering process using inference engine 310 for the subset of nodes under the node for the determined media type. For example, if the media type is determined to be a photograph, a metadata-gathering process may be initiated for the subset under photograph node 4330, which may include collecting metadata for size node 4332, description node 4334, author node 4336, etc. It should be understood that any of these nodes in the subset may be the root of further subsets, such that additional metadata-gathering processes may be initiated. It should also be understood that location node 4100, procedure node 4200, and media type node 4300 may all be children of the same parent node (not shown), which may be a root node of the entire knowledge structure 4000.

FIG. 4 also depicts metadata-wrapped content objects 350. In an embodiment, application 300 selects both an appropriate metadata structure and an appropriate markup format for a given content object. The metadata fields, stored as nodes in knowledge structure 4000, are processed by application 300 into the appropriate metadata structure and the appropriate markup format.

In some cases, the optimal metadata structure and/or markup format may not be the same for each subset within the knowledge structure created for a particular content object. Thus, different subsets within a knowledge structure, representing the metadata of a specific content object, may be processed by application 300 using different metadata structures and/or different markup formats, such that different metadata for the same content object may be output in different markup formats. For example, for the location subset under location node 4100 of knowledge structure 4000, application 300 outputs the metadata 440A in the metadata structure defined by the schema.org "LocalBusiness" schema, wrapped in the Microdata markup format. However, for the procedure subset under procedure node 4200 of knowledge structure 4000, application 300 outputs the metadata in the metadata structure 440B defined by the schema.org "MedicalProcedure" schema, wrapped in the JSON-LD markup format.

In some cases, there may not be a single optimal metadata structure and/or markup format in which to output certain metadata within a knowledge structure for a given content object. In such a case, application 300 may output that metadata in a plurality of different metadata structures and/or markup formats. For example, for the media type subset under media type node 4300 of knowledge structure 4000, application 300 may output the metadata in the subset under photograph node 4330 (i.e., size node 4332, description node 4334, author node 4336, etc.) in three different metadata structures and/or formats: in the metadata structure 440C defined by the schema.org "ImageObject" schema; as alternate text 440D via the HTML "alt" attribute; and as a Facebook™ "graph" object 440E using the Facebook™ OpenGraph™ metatag. Alternatively, application 300 may choose one or more of the metadata structures and/or formats in which to output the metadata (e.g., automatically or based on a user input).

1.5. Smart Metadata Gathering

The intelligent collection and output of metadata for a given content object will now be described, according to an embodiment. Initially, a content object is received by application 300. The content object may be received from another system (e.g., which transmits the content object across network(s) 120) or a user (e.g., who uploads the content object via a user interface or specifies the content object via a URL). In the case that the content object is specified as a URL, smart metadata gathering may be performed for every content object comprised in the resource at that URL.

In an embodiment, application 300 automatically detects the type of the content object. For example, application 300 may automatically detect the type of the content object based on a filename extension of the content object. The type of the content object may be one of an image, video, webpage, blog, theme, layout, etc.

In an embodiment, application 300 supports user interactions for the metadata-gathering process. Specifically, when the metadata-gathering process (e.g., process 500 described with respect to FIG. 5) determines that additional metadata is appropriate for a content object (e.g., based on the type of content object, prior metadata gathered for the content object, etc.), application 300 may prompt the user for the additional metadata. This prompt-based interaction between application 300 and the user may continue until all relevant metadata (e.g., as determined from the knowledge structure in construct database 114B) has been collected (or at least requested from the user via at least one prompt). From the user's perspective, the metadata-gathering process is a simple, intuitive process. However, application 300 has the potential to gather tremendous amounts of information, while asking relatively few and basic questions of the user.

In an embodiment, metadata construct management module 330 provides a user interface which allows an administrator to conduct periodic internal reviews of the metadata stored in construct database 114B. In addition, through this user interface of metadata construct management module 330, an administrator may modify the metadata schema (e.g., knowledge structure) stored in construct database 114B, based, for example, on changes to standard schemas, industry trends, user suggestions, reports generated by metadata construct management module 330, etc. Additionally or alternatively, this metadata schema stored in construct database 114B may be updated automatically, for example, whenever updates to metadata schemas are received from an external system 140.

As discussed elsewhere herein, construct database 114B may store a representation of an internal knowledge structure. The knowledge structure may comprise known, hierarchically-arranged metadata nodes or fields that can be associated with a content object based on the type of content object and other metadata (e.g., automatically detected or intuited, collected from a user, etc.). Examples of such metadata fields include, without limitation, type of medical procedure, type of treatment, specialty, condition treated, technology, technique, material, etc. In an embodiment, this internal knowledge structure, stored in construct database 114B, can only be altered by an administrator of platform 110 (e.g., when a standard schema changes).

Once all metadata has been gathered for a content object, the gathered content-object-specific metadata is stored, in association with that content object, in data database 114A. In embodiment in which platform 110 also implements a content management system, the content object may also be stored in data database 114A, along with its associated content-object-specific metadata.

In an embodiment, application 300 processes metadata into an optimal metadata structure and markup format. Application 300 may determine an optimal metadata structure for a given set of metadata (e.g., based on the type of metadata), and determine an optimal markup format in which to format the optimal metadata structure. The optimal metadata structure and markup format may represent a current metadata standard and markup format, respectively, that is most relevant to the content object and its associated metadata. Examples of metadata structures include, without limitation, Schema.org (a set of schemas that can be used to organize data markup on webpages), Dublin Core (a schema built upon a set of fifteen metadata terms that have been augmented by several "qualified" terms to form a more fully fleshed-out vocabulary), and the like. Examples of markup formats include, without limitation, JSON-LD, Microdata, and the like.

In an embodiment, the optimal metadata structure in the optimal markup format is output from application 300 as metadata-optimized code (e.g., an HTML or XML snippet, an entire webpage, etc.). The metadata-optimized code may be provided to a user for integration into or submission as a webpage.

The metadata-optimized code for a content object may be combined with the metadata-optimized code for other content objects. Thus, in the case that the content object comprises a webpage, which itself may comprise a plurality of different content objects, the metadata-optimized webpage that is output as the metadata-optimized code may be optimized in terms of the metadata structures and markup formats associated with each content object in the webpage.

In the case that the metadata-optimized code comprises a metadata-optimized webpage, the metadata-optimized webpage can be more easily and efficiently accessed by requesting systems 360 than the non-optimized webpage input as the original content object, since the metadata-optimized webpage comprises content objects with their respective optimal metadata structures and markup formats. Requesting systems 360, which access the metadata-optimized webpage, may include, without limitation, search engines, mobile apps, GPS devices, accessibility devices, as well as other devices and apps. Requesting systems 360 may retrieve and display metadata-optimized content objects in response to relevant search queries submitted by users.

2. Process Overview

Embodiments of processes for enhanced metadata collection will now be described in detail. It should be understood that the described processes may be embodied in one or more software modules that are executed by one or more hardware processors, e.g., as application 300, which may be executed wholly by processor(s) of platform 110, wholly by processor(s) of user system(s) 130, or may be distributed across platform 110 and user system(s) 130 such that some portions or modules of the application are executed by platform 110 and other portions or modules of the application are executed by user system(s) 130. The described processes may be implemented as instructions represented in source code, object code, and/or machine code. These instructions may be executed directly by the hardware processor(s), or alternatively, may be executed by a virtual machine operating between the object code and the hardware processors. In addition, the disclosed application 300 may be built upon or interfaced with one or more existing systems.

Figure 5:
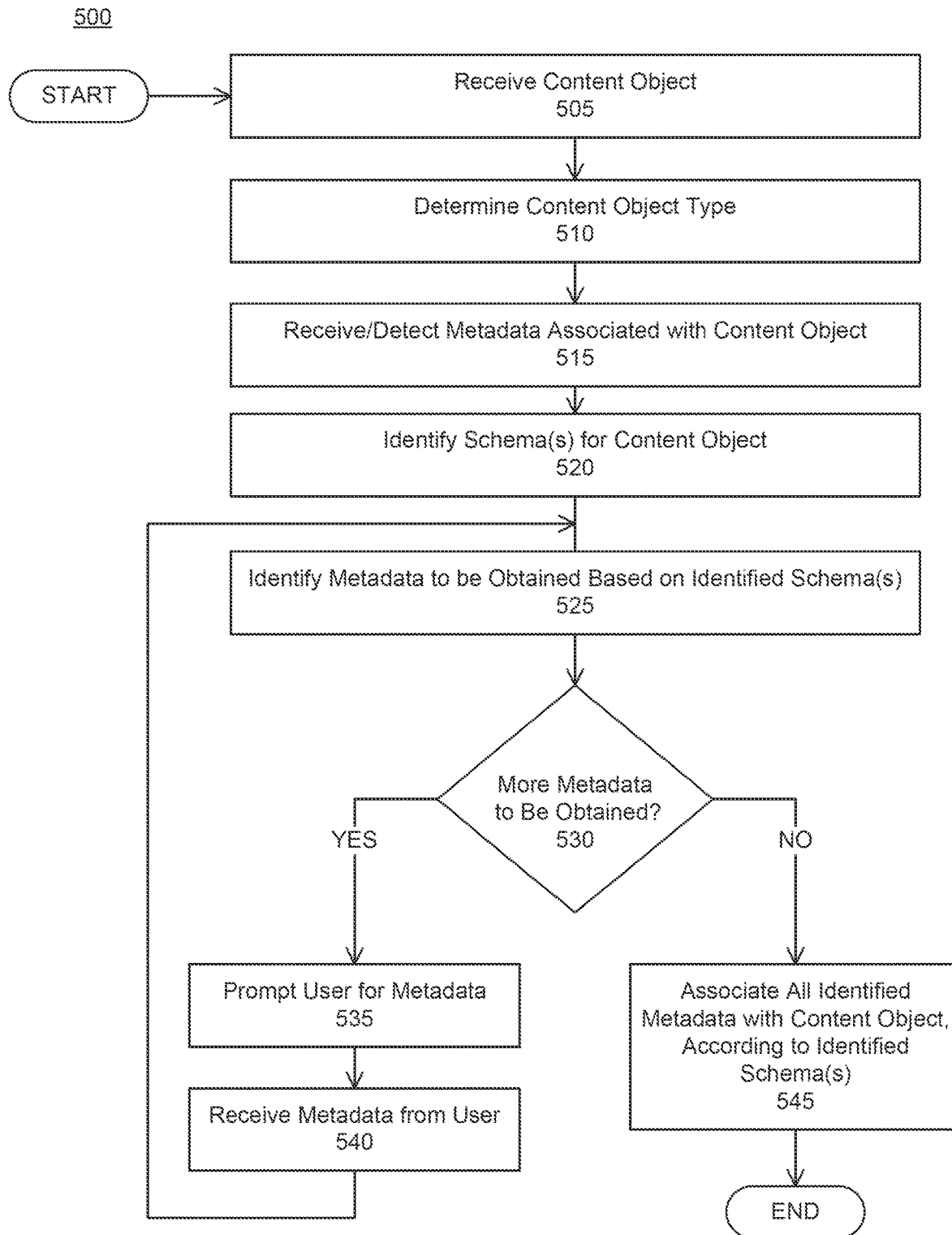
FIG. 5 illustrates a process for collecting metadata associated with a given content object, according to an embodiment.

FIG. 5 illustrates a process 500 for gathering metadata to be associated with a given content object, according to an embodiment. Process 500 may be implemented by inference engine 310. Process 500 starts when a content object (e.g., image, video, webpage, electronic document, etc.) is received in step 505.

In step 510, the type of the content object, received in step 505, is determined. The type of content object may be determined automatically based on the file type (e.g., filename extension). For example, if the filename extension is "JPG", it may be determined that the content object is an image.

In step 515, metadata, associated with the content object received in step 505, is received and/or detected. At least a portion of this metadata may be received from a user via one or more user interfaces (e.g., in response to one or more prompts). For example, application 300 may prompt the user to describe the content object, in response to which the user may enter a description of the content object. Additionally or alternatively, at least a portion of this metadata may be automatically detected based on metadata previously associated with the content object. For example, application 300 may access one or more metadata fields embedded in or otherwise previously associated with the content object. For an image or video, these previously associated metadata fields may comprise a height and width of the image, a geolocation (e.g., Global Positioning System (GPS) coordinates (e.g., latitude, longitude, and/or elevation), partial or full address, etc.), a camera type used to capture the image or video, an aperture setting used during capture of the image or video, and/or the like.

In an embodiment, application 300 may interface with construct database 114B to automatically correct any misspelled words input by a user (e.g., in response to any of the prompts described herein). For example, as discussed above, in step 515, as implemented in an embodiment of application 300, application 300 may prompt the user to input a description of an image detected in step 510. In response, the user may input "dental veeners." Application 300 may then attempt to match the term "dental veeners" to a value in construct database 114B, which may result in the identification of a closest-matching value of "dental veneers" in construct database 114B. Accordingly, application 300 may correct the input description from "dental veeners" to "dental veneers".

In step 520, one or more metadata schemas are identified for the content object, received in step 505. In an embodiment, these metadata schema(s) (e.g., corresponding to the subsets or subgraphs described with respect to the disclosed knowledge graph) may be identified based on the metadata received and/or detected in step 515. For instance, continuing the example described above in which the user-input description of an image is matched to a value of "dental veneers" in construct database 114B, this value in construct database 114B may be associated, either directly or indirectly, with a "medical procedure" schema type. Accordingly, in step 515, application 300 may identify the "medical procedure" schema as appropriate for use with the image. In addition, application 300 may identify a specialty schema in construct database 114B, within the "medical procedure" schema, such as "dental."

In step 525, metadata to be obtained is identified based on the schema(s) identified in step 520. For example, application 300 may determine that, for "dental veneers," the specialty schema of "dental" includes a "material" field that may accept a value of either "composite" or "porcelain." Application 300 may make this determination based on a knowledge base, as described elsewhere herein. For instance, the "material" field may be included as a node in a subset under a node representing a "dental" field in a knowledge structure of knowledge base 320. Once application 300 identifies the "dental" field node as relevant, application 300 may cycle through each metadata node in this subset under the "dental" field node, including the "material" field node and any other metadata nodes in the subset.

In step 530, it is determined whether there is more metadata, identified in step 525, to be obtained. If so (i.e., "YES" in step 530), in step 535, the user may be prompted for the metadata, and, in step 540, the metadata may be received from the user. For example, in response to the determination of the "material" field discussed above, application 300 may prompt the user, via a user interface of application 300, to input the type of material (e.g., "Which Material, Composite or Porcelain?"). For purposes of the example, the user may responsively select or otherwise input "Porcelain" within the user interface of application 300.

Steps 525-540 may continue to loop until all of the metadata, appropriate for the schema(s) identified in step 520, are obtained. Practically, this may involve application 300 traversing all relevant subsets (i.e., those subsets(s) determined to be relevant to the content object received in step 505) in the internal knowledge structure stored in construct database 114B. In this manner, process 500 incrementally refines the metadata to be associated with the content object received in step 505. For example, in response to a user input of "Porcelain" in step 540, application 300 may determine that the specialty schema (e.g., represented in the knowledge base) comprises a "condition treated" field for porcelain veneers that may accept a value of either "worn teeth" or "aesthetics." Accordingly, process 500 loops again to prompt the user in step 535 to specify the type of condition being treated (e.g., "Worn Teeth (functional) or Aesthetics (cosmetic)?"), and to receive the user's response in step 540. For purposes of the example, the user may responsively select or otherwise input "Worn Teeth."

Once all of the identified metadata has been obtained (i.e., "NO" in step 530), in step 545, all of the identified metadata may be associated with the content object, received in step 505, according to the schema(s) (e.g., subsets of the internal knowledge structure stored in construct database 114B) identified in step 520. Then, process 500 ends. For example, in response to a determination by application 300 in step 530 that all possible metadata has been obtained, application 300 may associate a "procedure" field with a value of "dental veneers," a "material" field with a value of "porcelain," and a "condition treated" field with a value of "worn teeth," with the received image, according to the "dental" specialty schema and/or "medical procedure" schema.

In an embodiment, process 500 may automatically associate other metadata, identified based on the schema(s) identified in step 520, with the content object. For example, since application 300 has determined that the image is of "dental veneers," which is associated with a type of medical procedure in the dental specialty, application 300 may associate this information, as metadata, with the image, without any prompting of the user or other intervention from the user.

3. Example Uses Cases

Some non-limiting example use cases will now be described. These use cases are included merely to illustrate possible uses of certain embodiments of application 300.

3.1. Doctor's Web Site

A doctor may utilize the content management system of application 300 to create a new webpage, directed to the subject matter of liposuction, for his or her website. Application 300 may provide one or more user interfaces comprising one or more inputs into which the doctor may enter content and metadata for the webpage.

As the doctor is entering information into one of the inputs, or even before the doctor begins entering information into the input, application 300 may automatically suggest an entry that fits into a currently-accepted taxonomy (e.g., stored as a knowledge structure in construct database 114B). For example, as the doctor enters a title into an input, application 300 may suggest a title that fits into a currently-accepted taxonomy. Application 300 may provide automatic suggestions, in this manner, for any of the inputs by the doctor, thereby promoting the use of currently-accepted taxonomies in the creation of metadata and/or content. This can eliminate or at least reduce the use of obscure metadata and/or content that may be difficult for search engines or users to understand.

In an embodiment, inference engine 310 identifies related metadata fields based on known values (e.g., fields associated within a knowledge structure with the known values), such as keywords (e.g., parsed from user inputs), the type of content object (e.g., determined automatically by application 300), etc. These identified related metadata fields may be unknown, in which case a user may be prompted to enter values for them, or known (e.g., based on the knowledge structure and/or data already associated with the content object). In addition, inference engine 310 may match known keywords with accepted, popular, and/or normalizing synonyms, and automatically suggest the matched synonyms to a user for association with a content object or automatically add the matched synonyms to the metadata associated with the content object. In this manner, the metadata of related content objects can be normalized (e.g., include identical labels or metadata values). For example, in response to detecting that an uploaded content object is a photograph and features a nose (e.g., based on facial recognition), application 300 may suggest associating the photograph with a label of "rhinoplasty" and/or other attributes or automatically associate the photograph with the label of "rhinoplasty" and/or other attributes. Application 300 may do this for every uploaded photograph featuring a nose, such that the metadata associated with all rhinoplasty photographs are normalized, for example, by each including the label of "rhinoplasty."

In addition, application 300 may suggest content objects and/or metadata to be added to the webpage, based on associations with known content or metadata. For example, application 300 may receive a title or other description of the webpage (e.g., by the doctor), parse the title or other description to identify the term "liposuction," determine that the term "liposuction" is associated with a medical procedure, access a subset of the application's internal knowledge structure corresponding to medical procedures, and prompt the user to provide content objects and/or metadata based on nodes within the subset.

For example, based on the application's determination that a webpage is related to a medical procedure, application 300 may prompt the user to add one or more of the following content objects:

- Text with at least N words, where N is a predetermined integer;
- Before-and-after photographs for the medical procedure;
- Testimonial videos from patients;
- Links to related blog posts;
- Links to related topics; and/or
- Links to social media sites.

In some instances, application 300 may provide an instruction to the user creating the website to not use photographs or videos of the procedure being performed. This may be helpful, for example, if such content would generally be offensive to end users, violate some ethical or other standard, violate a law, etc. Thus, for example, application 300 may prompt the doctor to upload before-and-after photographs of a liposuction procedure, but warn the doctor not to upload photographs of the liposuction procedure itself.

Once application 300 has collected all identified metadata represented in the internal knowledge structure (or at least provided the doctor with an opportunity to input all identified metadata), application 300 may automatically determine how to structure the metadata and in which format the metadata should be output, based, for example, on the type of content object with which the metadata is associated. Then, application 300 may output the metadata in the determined structure and format (e.g., for metadata associated with a photograph, according to an ImageObject schema in an HTML "alt" tag; for an address, according to a LocalBusiness schema in Microdata; etc.).

3.2. Search Engines

Some search engines, such as Google™, have specific requirements and preferences as to what kind of information they are seeking and how that information is presented. Advantageously, application 300 can provide guidance to users on the naming conventions, metadata standards, and content presentations that these search engines require or prefer. In this manner, platform 110 directs users to produce exactly the type of metadata that search engines require or prefer. This optimizes the ability of content, produced by these users, to be searched by these search engines, thereby enabling the users' content to reach a wider audience. Simply put, platform 110 helps machines better understand content for the purposes of search indexing or identifying relationships between data.

3.3. Mobile Apps

Currently, many mobile apps, such as mapping apps (e.g., Apple Maps™, Google Maps™, etc.) pull data from external sources (e.g., Yelp™). This data generally comprises content and metadata (e.g., review ratings) which are displayed by the mobile app (e.g., on a virtual map). Other mobile apps may include automobile media systems, smart watch apps, etc.

These mobile apps can pull data, including metadata, from application 300 on platform 110. When requested by a mobile app, application 300 can package the metadata in an appropriate structure and format with the associated content object into a metadata-wrapped content object 350, and transmit the package to the mobile app. Since the metadata structures and formats used by application 300 evolve as standards evolve (and potentially even before standards evolve), application 300 can always package the metadata in the most current structure and format available.

3.4. Content Viewers

A properly managed and structured website, as facilitated by application 300, promotes the proper, standardized organization of information. This, in turn, aids browsers and other content viewers in rendering the content in those websites in the native or other formats desired by the browser or other content viewer. Thus, application 300 enables browsers and other content viewers to render and display content more efficiently.

For example, content display can be easily optimized by a content viewer based on content object type, user preference, the device on which the content is being displayed, etc. For instance, Safari™ has a "reader mode" which uses automated detection to provide a cleaner view of text content to a user. If browsers or other content viewers received more standardized structured and formatted metadata associated with content objects, additional and potentially more useful data views would be possible, including menu view, location or map views, phone integration, and/or the like.

In the future, browsers may directly interpret and use metadata to produce a layer above websites, to deliver a better user experience. Platform 110 with application 300 facilitates browsers' abilities to produce such layers. For example, browsers may allow users to:

See an address and a map.

See a phone number and offer a voice service.

See the geolocation of a photograph and view other photographs from the same or nearby location. For example, if a user is thinking about buying a house, the browser could retrieve the geographical information and display other photographs, from the web, of the house or neighborhood.

3.5. Accessibility Devices

Platform 110 with application 300 may have a profound impact on accessibility devices. As discussed elsewhere herein, application 300 facilitates the generation of deeper, more comprehensive metadata for any given content object, and ensures that this metadata is structured and formatted in the most appropriate and current manner available. A content reader (e.g., for a blind person) can be easily configured to identify and read aloud this deeper metadata. For example, the content reader could more effectively describe a photograph to a blind person by reading aloud metadata representing the location at which the photograph was taken, the direction of the camera when the photograph was taken, the angle of the camera when the photograph was taken, the colors in the photograph, etc.

3.6. Provision of Goods or Services

In an embodiment, application 300 may gather information about a particular user, and generate a user profile, based on the gathered information and with associated metadata, for use by inference engine 310 or other software module. For example, application 300 may provide a user interface to a user which gathers the user's preferences (e.g., favorite food(s), activity(ies), brand(s), product(s), media, artist(s), sports team(s), hobby(ies), interest(s), etc.) or other user-specific information, to be stored in the user profile for that particular user. This user profile may be stored by application 300 locally on a user's mobile device (e.g., internal or external data chip or other computer-readable medium) and/or remotely on platform 110 or an external system 140, including in the cloud. Regardless of where the user profile is stored, the user profile or information from the user profile may be used by inference engine 310 and/or shared with external service(s) (e.g., external system(s) 140), so that application 300 and/or the external service(s) may provide a more customized user experience to the user.

For example, application 300 may provide the user profile to an external hired car service (e.g., Uber™) or a navigation system of the user's vehicle or mobile device. The service could then use the preferences stored in the user profile and/or metadata associated with the user profile to identify nearby potential points of interest to the user during his or her transport. These points of interest could include, for example, nearby restaurant(s) specializing in the user's favorite food, nearby places related to the user's favorite activities, hobbies, and/or interests (e.g., a beach if the user's favorite activities include surfing, an automobile dealership specializing in rear-wheel drive 1980s sports cars if rear-wheel drive 1980s sports cars are specified as an interest in the user profile, etc.), and/or the like. These points of interest could be suggested to the user directly via application 300 or indirectly via the external service as the user enters a vicinity of each point of interest (e.g., within a predetermined radius of the point of interest).

Application 300 may gather the information for a user's profile via one or more user interfaces, and may do so incrementally. For example, a user interface of application 300 may prompt the user for his or her preferences, such as in the following illustration:

Prompt: What kind of food do you like?

User: Chicken

Prompt: Spicy chicken sandwiches?

User: Yes

Based on this information, application 300 (e.g., using inference engine 310) may subsequently identify ten nearby restaurants with spicy chicken sandwiches on their menus (e.g., by requesting the menu information from web service(s) that provide such menu information for the restaurants, and parsing or accessing metadata within the menu information). In addition, based on this menu information, application 300 may determine that three out of the ten nearby restaurants include pickles on their spicy chicken sandwiches. Accordingly, application 300 may seek additional information, such as in the following illustration:

Prompt: Do you like pickles on your spicy chicken sandwiches?

User: Yes

Application 300 may further determine that one out of the ten nearby restaurants has one hundred or more positive reviews that specifically mention the pickles on the spicy chicken sandwiches, that this one nearby restaurant is within a threshold drive time (e.g., five minutes) from the user's current location, that the user has not eaten in over four hours, etc. Based on this information, inference engine 310 of application 300 or a module of an external service, which receives these preferences within the user profile, may determine to recommend, to the user, a stop at this one restaurant.

Each time that application 300 receives a preference from the user (e.g., in response to a prompt), the received preference may be added to the user's profile, and used for future recommendations or suggestions. Thus, the user profile can become more comprehensive over time, and, consequently, the scope and quality of recommendations or suggestions may improve over time.

It should be understood that the above example can be generalized to the provision of virtually any recommendations or other beneficial information to a user. Generally, application 300 may collect user information (e.g., stored in a user profile) and/or additional information (e.g., user location, nearby points of interest), internally (e.g., collected by application 300) or from external devices or systems (e.g., collected from GPS, web services, etc.), and use that information to provide recommendations, or other information that the user is likely to find helpful, to a user (e.g., to stop at a particular nearby point of interest, to purchase a product, to view content, etc.). Application 300 could provide this information (e.g., recommendations) directly to the user, or could provide the information to an external service, which could then use that information to provide the recommendations or other benefits. For example, application 300 could provide the user profile with the appropriate metadata structure and/or markup format to an external service (e.g., an electronic kiosk, web service, etc.) via standard communication protocols (e.g., near-field communication (NFC), Bluetooth™, Wi-Fi™, etc.), and the external service can provide a recommendation or other beneficial information to the user.

As an example, a user at a mall may approach an electronic mall directory (e.g., a map or listing including food providers). Using his or her mobile device, the user may establish communication with the electronic directory (e.g., via NFC, Bluetooth™, Wi-Fi, etc.). Application 300 (e.g., via client application 132 executing on the user's mobile device) may transmit the user's profile, including the optimized metadata structure, to the electronic directory. The electronic directory could then use that user profile and metadata to identify food providers in which the user might be interested (e.g., food providers specializing in the user's favorite foods or types of food), and visually notify the user of where those food providers may be found in the mall (e.g., on a map displayed in the electronic directory).

As another example, a user may visit a clothing store and approach an electronic kiosk or display in the store. Using his or her mobile device, the user may establish communication with the electronic kiosk (e.g., via NFC, Bluetooth™, Wi-Fi, etc.). Application 300 (e.g., via client application 132 executing on the user's mobile device) may transmit the user's profile, including the optimized metadata structure, to the electronic kiosk. The electronic kiosk could then use that user profile and metadata to identify brands, sizes, cuts, etc. in which the user might be interested (e.g., brands, sizes, cuts, etc. that match preferred brands, sizes, cuts, etc. stored in the user profile), and visually notify the user of where those brands, sizes, cuts, etc. are located within the store (e.g., on a map displayed in the electronic kiosk).

As described above, various embodiments of the disclosed processes may be implemented primarily in software. Alternatively, various embodiments of the disclosed processes may be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

In other words, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising using at least one hardware processor to:
   receive a content object;
   determine first metadata to be associated with the content object, wherein the first metadata is not currently associated with the content object;
   automatically traverse a plurality of hierarchically-arranged nodes within a knowledge structure by looping through a subgraph of the plurality of hierarchically-arranged nodes that corresponds to the first metadata until a leaf node of the plurality of hierarchically-arranged nodes is reached;
   acquire second metadata to be associated with the content object based on at least the leaf node, wherein the second metadata is not currently associated with the content object;
   select both a metadata structure and a markup format for the content object based on at least a subset of the plurality of hierarchically-arranged nodes that were traversed, wherein the metadata structure incorporates both the first metadata and the second metadata;
   wrap the content object with the metadata structure in the markup format; and
   output the wrapped content object.

2. The method of claim 1, wherein determining the first metadata comprises identifying a type of the content object, wherein the first metadata comprises the type of the content object.

3. The method of claim 2, wherein the type of the content object comprises a media type.

4. The method of claim 1, wherein acquiring the second metadata comprises:
   prompting a user to input, via a user interface, a value for at least one metadata field that is associated with the at least one node; and
   receiving a user input of the value for the at least one metadata field via the user interface, wherein the second metadata is based on the received user input.

5. The method of claim 4, wherein the second metadata comprises the user input of the value.

6. The method of claim 4, wherein prompting the user comprises suggesting to the user, via the user interface, a naming convention to be used for the second metadata.

7. The method of claim 1, wherein acquiring the second metadata comprises:
   deriving at least one metadata field from the leaf node;
   acquiring a value for the at least one metadata field; and
   determining the second metadata based on the acquired value for the at least one metadata field.

8. The method of claim 7, wherein the first metadata comprises a name of a medical procedure.

9. The method of claim 8, wherein the subgraph corresponds to the medical procedure, wherein the leaf node corresponds to a medical condition, and wherein the method further comprises:
   inferring that the medical condition should be acquired as metadata based on the leaf node being in the subgraph, so as to derive the at least one metadata field from the leaf node;
   prompting a user to input a value for the medical condition into the at least one metadata field via a user interface; and
   receiving a user input of the value for the medical condition to be used as the second metadata.

10. The method of claim 1, wherein one or both of the metadata structure and the markup format are determined based on at least one of a search trend, a type of content management system in which the content object will be managed, a type of network to be used to access the content object, a security requirement, a browser to be used to view the content object, a search engine to be used to retrieve the content object, hardware to be used to view the content object, or a frequency of updates to the knowledge structure.

11. The method of claim 1, comprising selecting a plurality of metadata structures for the content object, wrapping copies of the content object in each of the plurality of metadata structures, and outputting all of the wrapped copies of the content object.

12. The method of claim 1, comprising determining a plurality of markup formats for the content object, wrapping copies of the content object in each of the plurality of markup formats, and outputting all of the wrapped copies of the content object.

13. The method of claim 1, wherein the first metadata comprises a keyword.

14. A system comprising:
   at least one hardware processor;
   a database storing a plurality of content objects and a knowledge structure; and
   one or more software modules that, when executed by the at least one hardware processor,
      update the knowledge structure over time, and
      in response to a request from a requesting system over at least one network, for each content object in a user interface of the requesting system,
         receive retrieve the content object from the database,
         automatically traverse a plurality of hierarchically-arranged nodes within a current version of the knowledge structure in the database by looping through a subgraph of the plurality of hierarchically-arranged nodes that corresponds to the content object, until a leaf node of the plurality of hierarchically-arranged nodes is reached, to identify metadata to be associated with the content object,
         select both a metadata structure and a markup format for the content object based on at least a subset of the plurality of hierarchically-arranged nodes that were traversed, wherein the metadata structure incorporates the identified metadata,
         wrap the content object with the metadata structure in the markup format, and
         output the wrapped content object to the requesting system over the at least one network.

15. The system of claim 14, wherein traversing the plurality of hierarchically-arranged nodes comprises identifying the subgraph based on a type of the content object.

16. A non-transitory computer-readable storage medium having instructions stored thereon, wherein the instructions, when executed by a processor, cause the processor to:
   receive a content object;
   determine first metadata to be associated with the content object, wherein the first metadata is not currently associated with the content object;
   automatically traverse a plurality of hierarchically-arranged nodes within a knowledge structure by looping through a subgraph of the plurality of hierarchically-arranged nodes that corresponds to the first metadata until a leaf node of the plurality of hierarchically-arranged nodes is reached;

acquire second metadata to be associated with the content object based on at least the leaf node, wherein the second metadata is not currently associated with the content object;

select both a metadata structure and a markup format for the content object based on at least a subset of the plurality of hierarchically-arranged nodes that were traversed, wherein the metadata structure incorporates both the first metadata and the second metadata;

wrap the content object with the metadata structure in the markup format; and output the wrapped content object.

17. The non-transitory computer-readable medium of claim 16, wherein determining the first metadata comprises identifying a type of the content object, wherein the first metadata comprises the type of the content object.

18. The non-transitory computer-readable medium of claim 16, wherein acquiring the second metadata comprises:
prompting a user to input, via a user interface, a value for at least one metadata field that is associated with the at least one node; and
receiving a user input of the value for the at least one metadata field via the user interface, wherein the second metadata is based on the received user input.

19. The non-transitory computer-readable medium of claim 16, wherein acquiring the second metadata comprises:
deriving at least one metadata field from the leaf node;
acquiring a value for the at least one metadata field; and
determining the second metadata based on the acquired value for the at least one metadata field.

* * * * *